United States Patent [19]

Trittipoe

[11] 4,078,820
[45] Mar. 14, 1978

[54] BAIL FOR PUSH-PULL SCRAPER
[75] Inventor: Jack H. Trittipoe, Elwood, Ill.
[73] Assignee: Caterpillar Tractor Co., Peoria, Ill.
[21] Appl. No.: 737,242
[22] Filed: Oct. 29, 1976
[51] Int. Cl.² .......... F16L 13/02; B60D 1/04
[52] U.S. Cl. ................ 280/481; 228/154; 228/165
[58] Field of Search ........... 280/481; 403/268, 270, 403/271, 272; 228/165, 154, 173 F, 178

[56] References Cited
U.S. PATENT DOCUMENTS

| | | | |
|---|---|---|---|
| 3,434,738 | 3/1969 | Campbell | 280/481 |
| 3,512,811 | 5/1970 | Bardgette | 403/272 |

Primary Examiner—Joseph F. Peters, Jr.
Assistant Examiner—R. Schrecengost
Attorney, Agent, or Firm—Phillips, Moore, Weissenberger, Lempio & Majestic

[57] ABSTRACT

An improved bail for a push-pull scraper includes a straight tubular members having a plurality of longitudinal slots provided in the ends thereof, and curved members having end portions of reduced diameter and having longitudinal ridges provided thereon whereby the ends of the curved members will fit telescopically within the ends of the straight members with the longitudinal ridges disposed within the slots in the straight members for extended welding thereof.

12 Claims, 3 Drawing Figures

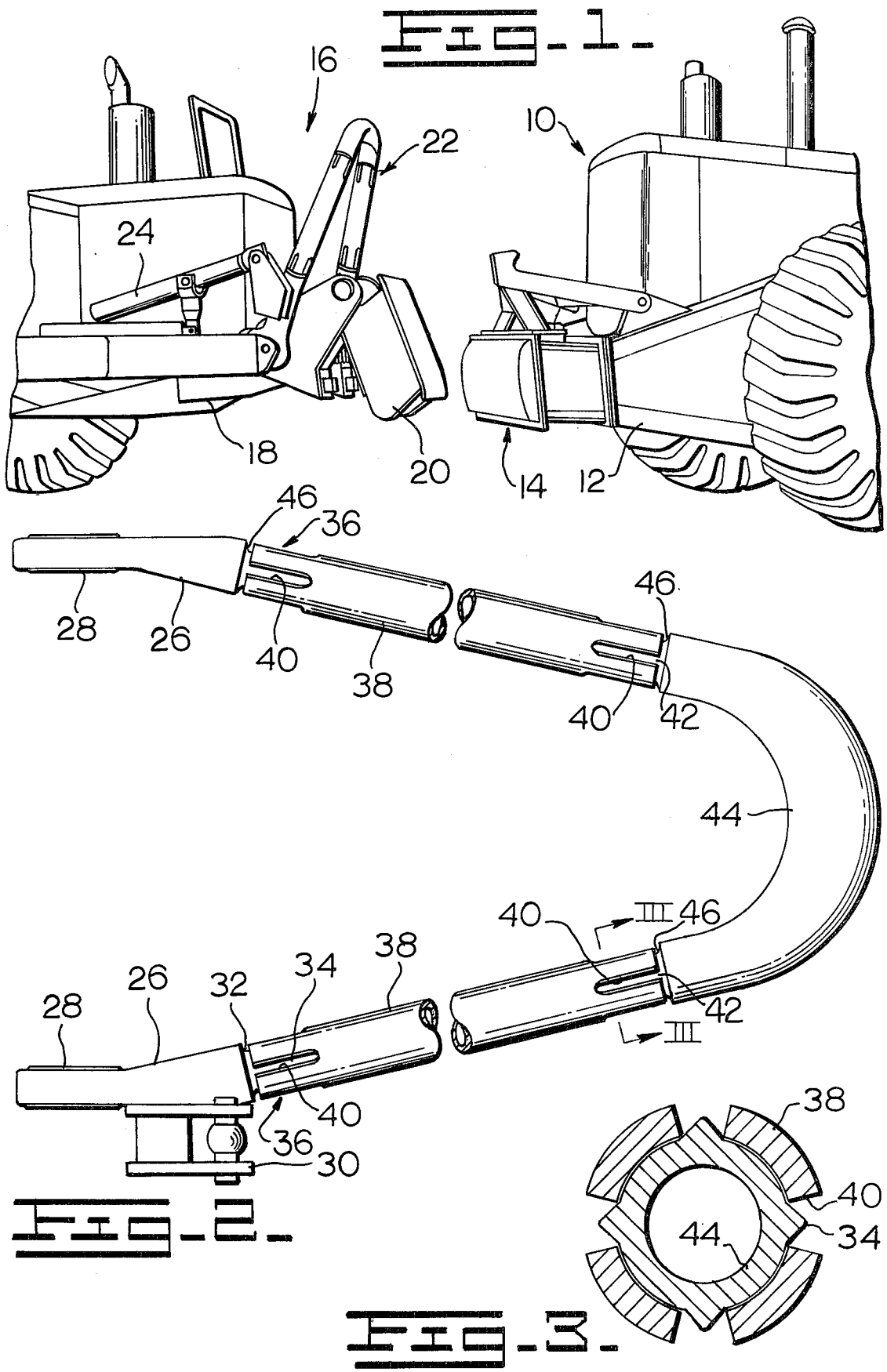

BAIL FOR PUSH-PULL SCRAPER

BACKGROUND OF THE INVENTION

This invention relates to push-pull couplings for earth moving scrapers and more particuarly to the construction of the bail portion thereof.

Push-Pull couplings for tandem operation of earth moving scrapers, are disclosed in U.S. Pat. No. 3,434,738 entitled "Push-Pull Coupling For Tractor-Scraper Units" issued on Mar. 25, 1969 and assigned to the assignee of the present invention, which shows the prior art bail construction.

The construction of the prior art bails comprised a series of straight and curved tubular members having their ends in abutting relationship and joined together by circumferential welds therearound. However during the pulling phase of a loading operation by scrapers coupled by such a coupling, very heavy loads are applied to the bail, resulting in frequent failure of the circumferential welds thereof.

Accordingly it is an object of the present invention to provide a bail construction for a push-pull scraper coupling having greater strength than that provided by the prior art circumferential surface welds of the bail tube members.

SUMMARY OF THE INVENTION

The present invention provides an improved bail construction for a push-pull coupling for tandem operated scrapers in which the tubular members comprising the bail have a first set of ends which are provided with longitudinal slots, and a second set of ends having a reduced diameter which is provided with longitudinal ridges whereby such second ends will fit telescopically within said first ends with the ridges disposed within the slots. The members are then joined together by both circumferential welds, and longitudinal welds of the ridges to the walls of the slots, providing greater strength in the connections of the tubular members of the bail.

BRIEF DESCRIPTION OF THE DRAWINGS

FIG. 1 is a perspective view of a push-pull coupling employed by two scrapers, and having an improved bail of the present invention;

FIG. 2 is a plan view of the improved bail of the present invention; and

FIG. 3 is a cross-sectional view of the bail shown in FIG. 2 taken along the line in the direction indicated by the arrows III—III. rspective view of a push-pull

DESCRIPTION OF THE PREFERRED EMBODIMENT

Refering to FIG. 1, the rear portion of a forward scraper is shown generally at 10 and includes a frame 12 having a push-pull block and hook assembly 14 mounted thereon as described in the aforementioned patent. The forward end of a rearward scraper is shown generally at 16 and includes a frame 18 having a push-block 20 mounted thereon. Also pivotedly mounted on the frame is a bail 22 adapted for lowering into engagement with the hook assembly on the rear of the forward tractor by means of a hydraulic cylinder 24 controllable by the operator of the rearward scraper.

Referring now to FIG. 2, bail 22 includes a pair of angular members 26 having pivots 28 provided in one end thereof. A bracket 30 is welded to the side of one of the angular members for connection of the hydraulic jack to the bail.

The other ends of the angular members 26 are provided with a reduced diameter portion 32 which has longitudinal ridges 34 provided thereon. Reduced diameter ends 32 thus fit telescopically within the end portions 36 of straight tubular members 38 which have slots 40 provided therein for accommodation of longitudinal ridges 34 in the reduced diameter ends of angular members 26.

The other ends of straight members 38 are similarly constructed, and mate in a similar manner with reduced end portions 42 on the respective ends of a curved member 44 which joins the two straight members together to complete the bail. The reduced end portions 42 of curved member 44 are provided with longitudinal ridges 34 in a manner similar to the reduced end portions of angular members 26, which fit within slots 40. The ends of straight members 38 abut against neck portions 46 which join reduced end portions 32 and 42 to angular members 26 and 44 respectively.

Referring to FIG. 3, it will be noted that the side walls of the slots formed in the ends of straight members 38 extend radially outward through members 38. The ridges provided on the reduced diameter end portions of the curved and angular members are preferably triangular in cross section and have sides which begin at the inner edges of the slot side walls and project outwardly and inwardly of the slot side walls and meet at approximately the middle of the slot.

The longitudinal ridges 34 are welded to the side walls of slots 40, and the ends of straight members 38 are welded to neck portions 46. The weldments formed thereby will essentially fill the area in the slots between the slot side walls and the sides of the ridges.

Accordingly a bail constructed in accordance with the present invention comprises members which are joined together not only by circumferential welds between ends of the straight members and the neck portions of the angular and curved members, but also by longitudinal welds between the longitudinal ridges provided on the curved and angular members and the side walls of the slots provided in the straight members 38. Thus the connection of the respective members in the bail of the present invention is much stronger than prior art bails, and is more adapted to withstand the loads occuring during tandem pulling operations.

What is claimed is:

1. A bail for a push-pull scraper coupling comprising angular members, straight members joined to said angular members, and a curved member joined to said straight members, said angular members, straight members, and curved member having ends comprising first end portions having longitudinal slots provided therein, and second end portions having reduced diameters and disposed telescopically within said first ends, and having longitudinal ridges provided thereon disposed within said slots in said first end portions.

2. The bail defined in claim 1 further comprising circumferential weldments joining said members together, and longitudinal weldments joining said members together.

3. The bail construction defined in claim 2 wherein the reduced end portions of the members are joined to said members by neck portions, and wherein said first ends abut said neck portions and are circumferentially welded thereto, and wherein the longitudinal ridges are longitudinally welded to the walls of the slots.

4. The bail construction defined in claim 1 wherein the ends of the straight members comprise said first ends, and the end portions of the curved member and the angular members comprise said second end portions.

5. The bail construction defined in claim 1 wherein the side walls of the slots are radial, and wherein said longitudinal ridges have a triangular cross section and have sides disposed approximately 45° with the side walls of the slots.

6. The bail construction defined in claim 5 wherein said triangular ridges project radially outwardly at least half way into said slots.

7. The bail construction of claim 6 further comprising weldments filling the area between the side walls of the slots and the triangular ridges and joining said ridges to said side walls.

8. First and second tubular members and juncture means connecting ends of said first and second tp1 circumferential weldment means joining said abutting circumferential portions of said members, whereby the size and dimensions of said last named weldment means are controlled.

9. The construction of claim 8 wherein an end of one of said members is disposed telescopically within an end of the other of said members.

10. The construction of claim 9 wherein an end of one of said members has slot means provided therein and said longitudinal weldments are formed in said slot means.

11. The construction of claim 10 wherein an end of the other of said member has ridge means provided thereon which are disposed in said slot means, and wherein said longitudinal weldments join said ridge means and said slot means.

12. The construction of claim 11 wherein said longitudinal weldments means are connected with said circumferential weldment means.

* * * * *

UNITED STATES PATENT OFFICE
CERTIFICATE OF CORRECTION

Patent No. 4,078,820          Dated March 14, 1978

Inventor(s) Jack H. Trittipoe

It is certified that error appears in the above-identified patent and that said Letters Patent are hereby corrected as shown below:

Claim 8, column 3, line 19
delete "tp 1" and replace with --tubular members in telescoping coaxial relationship, said juncture means comprising:
    means defining abutting circumferential portions of said first and second tubular members, means defining longitudinal portions of said members, longitudinal weldment means joining said longitudinal portions of said members, --

Signed and Sealed this

Twenty-second Day of August 1978

[SEAL]

Attest:

RUTH C. MASON
Attesting Officer

DONALD W. BANNER
Commissioner of Patents and Trademarks